June 2, 1970    G. W. MEADOWS    3,514,818
COBALT BONDED TUNGSTEN CARBIDE CUTTING TOOLS
Filed June 4, 1969    4 Sheets-Sheet 1

INVENTOR
GEOFFREY W. MEADOWS

BY John R. Powell
ATTORNEY

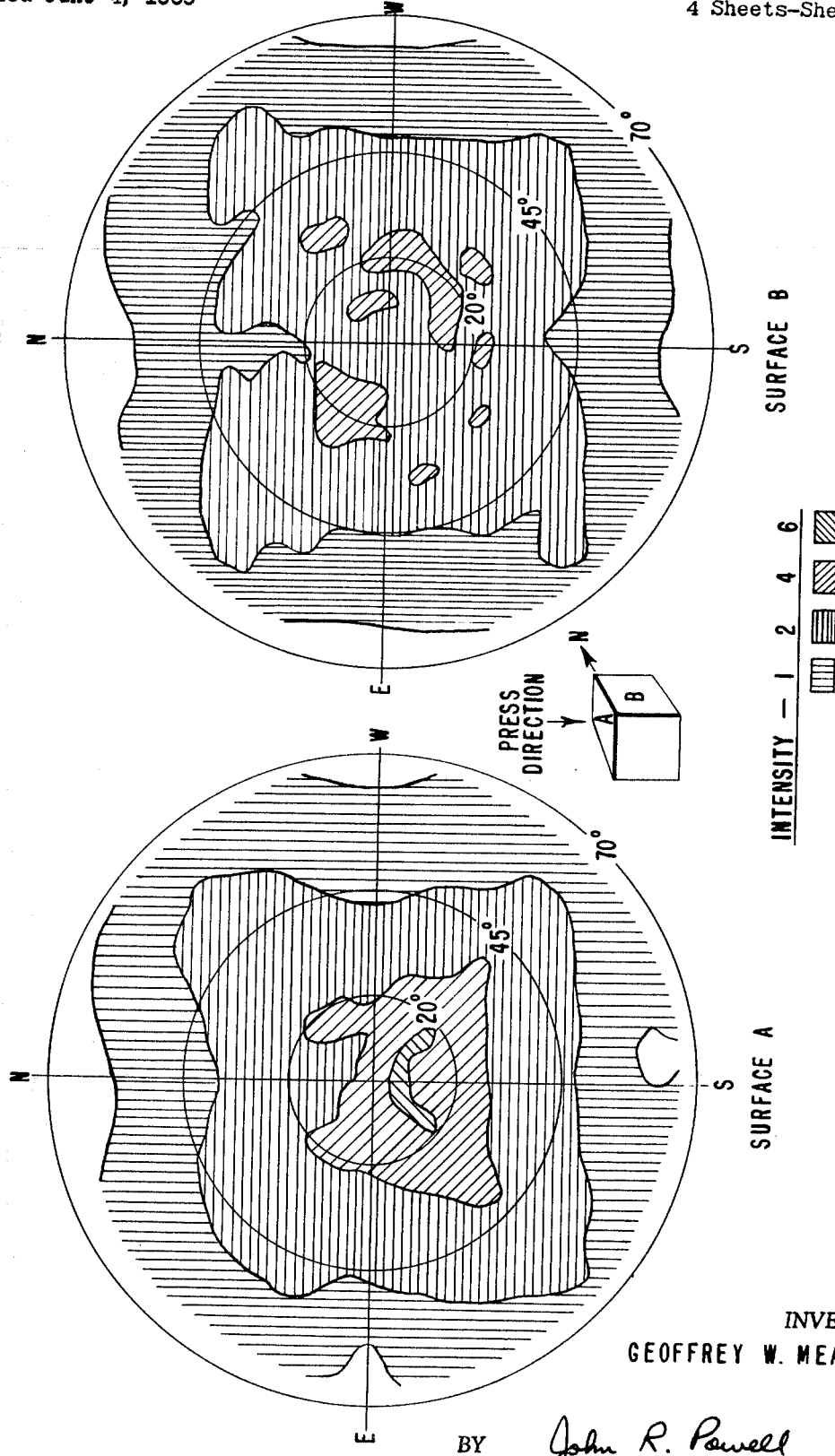

INVENTOR
GEOFFREY W. MEADOWS
BY John R. Powell
ATTORNEY

United States Patent Office 3,514,818
Patented June 2, 1970

3,514,818
COBALT BONDED TUNGSTEN CARBIDE
CUTTING TOOLS
Geoffrey W. Meadows, Kennett Square, Pa., assignor to
E. I. du Pont de Nemours and Company, Wilmington,
Del., a corporation of Delaware
Continuation-in-part of application Ser. No. 660,986,
Aug. 16, 1967. This application June 4, 1969, Ser.
No. 830,247
Int. Cl. C22c 29/00
U.S. Cl. 29—182.8                              10 Claims

ABSTRACT OF THE DISCLOSURE

Tools having a working surface, such as a cutting edge, of tungsten carbide bonded with from 1 to 30 percent by weight of tungsten-cobalt alloy are useful as tips, inserts and bits for cutting, punching and otherwise shaping metal.

CROSS-REFERENCE TO RELATED APPLICATION

This application is a continuation-in-part divisional of my copending application Ser. No. 660,986 filed Aug. 16, 1967, now Pat. No. 3,451,791, which in turn was a continuation-in-part of my then copending application Ser. No. 582,924 filed Sept. 29, 1966 now abandoned, and my then copending application Ser. No. 516,825 filed Nov. 24, 1965 now abandoned. My copending application Ser. No. 582,924 was a continuation-in-part of my copending application Ser. No. 516,825 and both of these were continuations-in-part of my application Ser. No. 418,808 filed Dec. 16, 1964 now abandoned.

BACKGROUND OF THE INVENTION

This invention relates to shaping tools having a working surface of tungsten carbide bonded with from 1 to 30 percent of tungsten-cobalt alloy.

The term "shaping tool" as used hereinafter will be recognized to include tips, inserts, dies, bits and tools for cutting, turning, drilling, gundrilling, punching, heading, extruding, drawing, stamping, scoring, piercing, perforating, slitting, reaming, trepanning, tapping, hobbing, counterboring or otherwise shaping metal. Thus, the shaping tool can be employed in vibratory drills, routers, end mills, rotary drills, rotary saws, thread chasers, shavers, planers, broachers, stamping, punching and extrusion presses and many other types of metal shaping equipment.

The working surface of the shaping tools of this invention will frequently be referred to herein as cobalt-bonded tungsten carbide, a term commonly employed to describe a well-known class of compositions, but it will be understood that the cobalt binder phase contains appreciable amounts of tungsten and is thus in reality a tungsten-cobalt alloy.

It has been generally accepted, by those skilled in the cobalt-bonded tungsten carbide art, that it is not possible to achieve maximum hardness and maximum strength and toughness simultaneously in a single composition. It was commonly recognized that for greatest hardness the composition should contain a minimum of cobalt binder and have the finest tungsten carbide grain size. Conversely for greatest strength and toughness the composition should contain large amounts of cobalt. See Cemented Carbides by Schwartzkopf and Kiefer, MacMillan Co. 1960 page 137. Tungsten carbide grain size and cobalt content were the only two variables known to effect marked property changes in the compositions. See American Machinist, vol. 105 (12), p. 95.

More recently a further variable, the composition of the metal phase has come under study. H. Kubota, R. Ishida and A. Hara in Indian Institute of Metals, Transactions, vol. 9, pp. 132–138 (1964) pointed out that when tungsten carbide grain size is not very fine and when the carbon to tungsten atomic ratio is below theoretical, as much as 10% tungsten can be present in solid solution in the cobalt phase. Increased tungsten in the cobalt was correlated with increased transverse rupture strength, hardness, and fatigue strength of high cobalt compositions.

However, it was further substantiated by H. Kubota along with H. Suzuki that if the tungsten carbide grain size was smaller than 2 microns the presence of tungsten in the cobalt corresponds to a decrease in the strength of the compositions. See Planseeherichte für Pulver Metallurgie, vol. 14, No. 2, pp. 96–109 August (1966). That a tungsten carbide grain size of 2 microns is optimum is reported by others such as J. Gurland and P. Bardzil, Journal of Metals, February 1955, pp. 311–315.

I have discovered however that cobalt-bonded tungsten carbide compositions can be prepared which have an outstanding combination of hardness, strength and toughness. Surprisingly my bonded compositions must have a very fine tungsten carbide grain size with the mean grain size smaller than one micron and at least 60% of the grains smaller than one micron in diameter. It is also essential that the bonded compositions contain at least 8 percent by weight of tungsten in the cobalt phase.

Shaping tools comprising a working surface of these bonded compositions are particularly effective for use in applications which subject the tool to excessive strains of one type or another. For example, they resist flaking, chipping and cracking in high speed cutting service; chipping and failure in small cross-sectional use; and early failure in many applications requiring a combination of good strength and hardness.

SUMMARY

In summary, this invention relates to metal shaping tools and is more particularly directed to shaping tools comprising a working surface consisting essentially of dense cobalt-bonded tungsten carbide compositions in which the mean grain size of tungsten carbide is less than one micron and at least 60% of the grains are smaller than one micron in diameter; the binder is a tungsten-cobalt alloy containing from 8 to 33% by weight of tungsten; and the composition contains 1 to 30 percent by weight of tungsten-cobalt alloy.

The shaping tools of this invention combine surprisingly high transverse rupture strength and toughness with extreme hardness to provide exceptional utility for cutting, drilling, shaping, punching or otherwise working very tough hard materials.

BRIEF DESCRIPTION OF THE DRAWINGS

Many of the advantages of this invention will become apparent from the description to follow and from the accompanying drawings in which:

FIGS. 5 and 6 are representations of actual pole figure patterns made on a commercially available cobalt-bonded tungsten carbide body.

DESCRIPTION OF THE INVENTION

Figure 1:
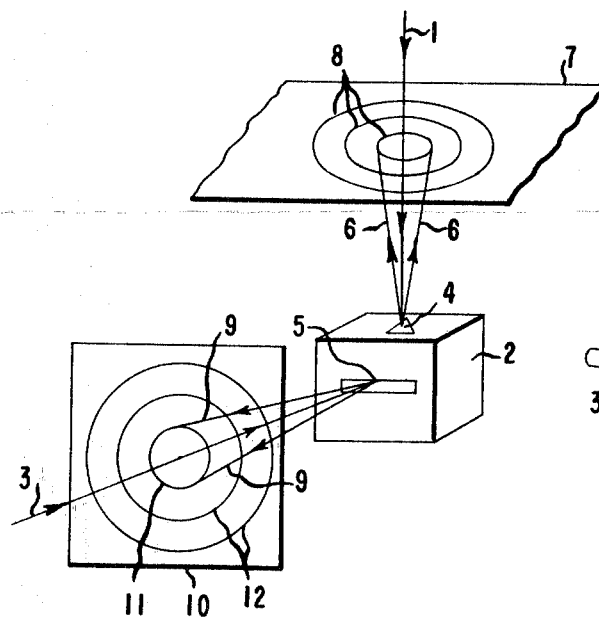
FIG. 1 is a schematic representation of the manner in which X-ray diffraction patterns are made on samples of the cutting edge of tools of this invention.

The principal aspect of this invention is a shaping tool comprising a working surface which consists essentially of dense cobalt-bonded tungsten carbide in which the tungsten carbide grains are quite uniform and quite small; the binder is a tungsten-cobalt alloy containing from 8 to 33% by weight of tungsten; and the bonded composition has a density in excess of 98% of the theoretical density.

A further aspect of this invention is a shaping tool comprising a working surface, such as a cutting edge, of dense cobalt-bonded tungsten carbide as described above wherein the tungsten carbide grains are anisodimensional and are oriented such that a substantial portion of the grains are aligned with their largest face parallel to a common line.

The cobalt-bonded tungsten carbide comprising the working surface of the shaping tools of this invention is referred to from time to time as an interdispersion. This term is meant to describe a relationship of tungsten-cobalt binder and tungsten carbide which includes traditional dispersions, in which there is a dispersed particulate phase and a dispersant continuous phase; traditional mixtures in which both phases are particulate or interrupted and homogeneously intermixed; and mixtures in which both phases are continuous and are interpenetrating into each other.

The staring materials suitable for use in preparing the shaping tools of this invention are the cobalt-bonded tungsten carbide products of my application Ser. No. 660,986 filed Aug. 16, 1967. Those products are prepared from tungsten carbide and cobalt which have a requisite degree of purity and a sufficiently fine particle size to produce the products described there, and in the examples that follow hereinafter.

Preparation of the shaping tools

The shaping tools of this invention are prepared from the consolidated cobalt/tungsten carbide bodies described in my application Ser. No. 660,986 filed Aug. 16, 1967.

A preferred method of fabrication is by hot pressing cobalt/tungsten carbide powders in the manner described below which results in a consolidated body requiring a minimum of preparation to be used as a shaping tool.

Various types of hot pressing equipment are known in the art and have been described in various publications. Depending on press design and desired operating characteristics, heating can be by resistance heating, dielectric heating, heating by hot vapors or gases, induction heating, or plasma torch heating. Extremely short heating times of a few seconds duration are attainable, by "resistance sintering under pressure," as described by F. B. Lanel, Trans. Amer. Inst. of Mining & Met. Eng., 1958, 203 (1955), but such a technique is most applicable only to relatively small pieces.

Temperature can be measured very near the sample itself by means of a radiation pyrometer and cross-checked for accuracy with an optical pyrometer. Such instruments should be calibrated against primary standards and against thermocouples positioned in the sample itself so that actual sample temperatures can be determined from their readings.

Automatic control of heat-up rate and desired temperature can be achieved by appropriate coupling mechanisms between a radiant pyrometer and the power source. Thermocouples, properly selected for the desired temperature range, can also be used, but pyrometers, even though somewhat less accurate, are more dependable and have vastly superior life.

The mold can be of a variety of shapes but is usually cylindrical, with a wall thickness of up to an inch or more. A round cross-section gives greater strength than square or other shapes. It is particularly advantageous to use a cylinder with a cross-section which is circular on the outside and square in the inside in pressing bodies to be used as cutting-tip inserts thereby fabricating them as near as possible to their final desired dimensions.

As an example, for a 1 inch diameter finished pressed round disc, the shell is cylindrical, 1 inch inside diameter 1½ inches outside diameter, 4 inches in length. Thin graphite discs ¼ inch in thickness and 1 inch in diameter are loaded in the cylinder on top and bottom of the material to be pressed. The surface of the graphite discs in contact with the sample can have a small depression at the center to form a tip on the sample and keep it positioned in the center of the mold when it shrinks away from the sides due to sintering. Graphite pistons 1 inch in diameter and 2 inches long are then loaded in both ends of the cylinder in contact with the ¼ inch discs and protruding from the cylinder.

Graphite parts used in the press tend to oxidize at the pressing temperatures used, and it is therefore necessary to maintain an inert atmosphere or vacuum within the press. In addition to prolonging the life of the graphite parts, the use of a vacuum or an inert atmosphere makes it possible to remove the mold containing the hot pressed body from the heart of the induction heated furnace and cool the sample much more quickly than if it were left to cool in the hot zone of the furnace after shutting off the power. The press can be arranged to permit the mold to be removed from the hot furnace, and when this is done the mold cools very rapidly by radiation. Thus a mold removed from the furnace at 1850° C. cools to dull red heat, about 800° C., in about 3 minutes. The cooling rate in an inert gas atmosphere is somewhat greater than in a vacuum, due to convection losses, but most of the heat loss is by radiation at the temperatures involved. The importance of rapid cooling in obtaining products of maximum strength will be further explained.

To avoid excessive oxidation leading to undesirable carbon deficiency, especially with powders not preheated or reduced, the powder should be loaded to the mold in a non-oxidizing atmosphere, preferably in a glove box filled with inert gas. The appropriate discs and pistons can then be inserted and the loaded mold can be handled with the contained powder essentially lossely packed or, for example, with no more pressure than can be applied to the pistons with the fingers. However, it is often convenient to apply about 200 to 400 p.s.i. pressure with a small press, to give a more compacted sample for greatest ease in handling and more uniformity.

In a preferred process, a cobalt-colloidal tungsten carbide powder is pressed at about 200 p.s.i. when it is loaded into the mold, brought to the maximum temperature with no pressure on the pistons, and held for 2 to 5 minutes at maximum temperature before applying any pressure. During the period at maximum temperature with no pressure applied, the body shrinks due to sintering. At the end of the period, the body attains 80–90% of theoretical density and, its diameter is about 60% of the mold diameter. The pressure is then applied, reaching maximum in 15 to 30 seconds, and the presintered body is reformed into conformity with the mold. Maximum pressure and temperature are applied until complete densification is attained, as indicated when movement of the rams ceases. This ordinarily does not require more than 5 minutes, and usually only one minute, after which the sample is immediately removed from the hot zone and permitted to cool rapidly by radiation to below 800° C. in about five minutes or less.

The conditions which give rise to the preferred dense cobalt-bonded bodies are quite important and should be precisely established for a particular composition and the type of structure desired.

Unduly long presintering times can be harmful due to excessive crystallite growth and the development of too extensive and rigid a cross-linked carbide structure. Too early an application of pressure can also be harmful because it brings the body into prolonged contact with the graphite mold causing carburization. Also in the case of bodies containing anisodimensional crystals of tungsten carbide, it tends to prevent orientation. Holding the sample for too long a time at maximum temperature should also be avoided, not only because of carburization but also since secondary crystallite growth tends to cause a coarsening of the structure and eventually the development of porosity. Cooling too slowly can also be detrimental, since the sample remains at high temperature long enough for undesirable crystallite growth an dstructural changes to occur. This includes changes in the composition of the cobalt binder phase. Thus with a low carbon content and the corresponding large amount of tungsten initially in the cobalt phase, precipitation of eta phase occurs at elevated temperatures. This can be minimized by brevity of hot pressing and rapidity of cooling of the pressed product. Generally speaking, it is undesirable to have more than about a third of the cobalt converted to eta phase.

While it is preferred that the dense cobalt-bonded tungsten carbide bodies be made by heating and sintering lightly compacted finely divided tungsten carbide-cobalt powders, followed immediately by application of pressure, it is sometimes desirable to carry out the sintering step as a separate operation.

Thus, in order to achieve maximum productivity from a hot press, the initial sintering step can be carried out in a separate furnace in an inert atmosphere. This can be accomplished in several ways. For example, the starting powder can be loaded or lightly compacted into molds to be later used for hot pressing, and then heated rapidly in an inert atmosphere to a temperature within from 50 to 200° of the final hot pressing temperature to be employed. The molds can then be removed from the furnace and permitted to cool, still under an inert atmosphere. Subsequently these sintered bodies can be hot pressed. Preferably, the mold and its partially sintered contents, while still hot, can be passed directly into a hot pressing operation, since this avoids heating the bodies twice.

Still another fabrication variation is employed to obtain "irregularly" oriented structures which contain a network of cobalt-rich veins. For this variation the starting powder after reduction is pressed under 200–500 p.s.i. and then sintered to a point at which there is slight fusion of the aggregates, but short of complete fusion. At this point the body is relatively strong and coherent, the aggregates having been sintered until they are essentially non-porous, there still being pores in the body between the aggregates. This structure is then hot pressed at maximum allowable temperature under controlled pressure, squeezing cobalt into voids to form, as the pressure is increased, a network of cobalt-rich veins running around and between areas of orientation. Pressing should not be continued, since this squeezes the metal out of the veins.

It should be emphasized that the degree of sintering, where the sintering step is carried out as a separate operation, is very important, and oversintering will produce a powder or a partially sintered body in which the tungsten carbide crystals have grown together into continuous tungsten carbide network which can be further molded or shaped only with difficulty. It is for this reason that one of the preferred processes involves simultaneous sintering, recrystallization to platelets and orientation of the platelets in a preferred direction while the mass is being molded to its final dense, non-porous form.

The maximum temperature at which the bodies should be pressed is largely dependent on the cobalt content, although the proper temperature is to some extent dependent on the size of the molded piece, the heating rate, and the available pressure as well. The bodies are conveniently subjected to a temperature of $T_m$ for a period of $t_m$ to 20 $t_m$ minutes, where $$T_m = \frac{6.5 - \log_{10}(P-0.3)}{0.0039} \pm 100°\ C.$$

and $$\log_{10} t_m = \frac{13250}{T_m + 273} - 8.2\ \text{minutes}$$

where P is the percent by weight of metal in the composition.

Thus, for compositions containing 6% cobalt it is about 1450° C., and for compositions containing 12% cobalt, it is about 1400° C.

It is preferred to bring the sample to the desired temperature as rapidly as possible. For example, a sample 1 inch in diameter can be heated to 1400° C. in 4 to 5 minutes, or to 1850° C. in 6 to 7 minutes, by introducing the mold into a preheated graphite block, the limiting factor being the rate of heat transfer from the graphite equipment via the mold to the sample. Rapidity of heating is especially important in compositions where the atomic ratio of carbon to tungsten is close to 1.0.

Pressure can be applied to the cobalt/tungsten carbide composition in a hot press through the action of remotely controlled hydraulic pneumatic rams. Applying pressure simultaneously through two rams to the top and bottom gives more uniform pressure distribution within the sample than does applying pressure through only one ram. An indicator can be attached to each ram to show the amount of ram movement, thereby allowing control of sample position within the heat field and indicating the amount of sample compaction. The end section of the rams, which are exposed to the high temperature zone should be made from graphite.

A variation of 100° from the mean specified temperature provides to some extent for the variables mentioned above. Thus, in order to attain temperature equilibrium in the interior without overheating the exterior, larger bodies require a lower temperature, which also permits a longer heating time. Higher temperatures and shorter times can be employed when high molding pressures can be used and smaller molded bodies are being made.

The most important factor in determining consolidation conditions is the physical nature of the heat-treated composition. When the composition is a heat-treated powder, for example, it can be loaded into graphite molds and heat and pressure simultaneously applied until the material reaches the recommended temperature range, $T_m$ at which the pressure is maintained for the specified time. The required pressure may be as low as 100 to 200 pounds per square inch for compositions such as those containing 15 to 30 percent by weight of cobalt and which are soft at the pressing temperature. Several thousands of pounds per square inch is required for bodies containing one to three percent cobalt, although pressures of not more than 4000 pounds per square inch are usually used where operations are in graphite equipment.

For compositions containing from three to fifteen percent cobalt the required pressure can also vary according to the physical nature of the composition. Thus if a sintered powder composition is used, which has been heat-treated at a temperature $T_s$ close to the maximum allowable temperature $T_m$, a high pressure such as 4000 p.s.i. is preferably applied over a prolonged period, such as continuously, while the mass is heated from 1000° C. to temperature $T_m$.

On the other hand, if degassed powder is preconsolidated to relatively high density such as about 50% of theoretical density, so that voids or pores larger than about ten microns are eliminated, and this compact is then heat-treated at temperature $T_s$, it shrinks spontaneously to a coherent body free from macropores, and if $T_s$ is then raised to $T_m$, sintering continues and a relatively dense body is obtained which can then be molded by brief application of pressure at temperature $T_m$.

To achieve high density requires application of pressure at the defined maximum temperature, $T_m$, to eliminate voids. In such instances the consolidation is carried out preferably until the body reaches a density of greater than 99 percent of theoretical, corresponding to a porosity of less than one percent by volume. However, for many shaping tools even this degree of porosity may be too high. The porosity of the bodies is characterized by preparing polished cross-sections of the bodies for examination under a metallurgical microscope. Pores observed in this way are classified according to a standard method recommended by the American Society for Testing Materials (ASTM) and described on pp. 116 to 120 in the book entitled "Cemented Carbides," published by the Mac-Millan Company of New York (1960). Thus, bodies are preferably pressed until a porosity rating of A–1 is obtained especially where the shaping tool is to be subjected to heavy impact or compression. This corresponds to a density of essentially 100% of theoretical or a volume porosity of 0.1%. However, porosities as great as A–5, corresponding to density of about 98%, are suitable for some of the shaping tools of this invention.

Pressures of from 500 to 6000 p.s.i. can be used in graphite equipment, but generally speaking not over 4000 p.s.i. can be applied without danger of breaking the equipment, unless the graphite mold and plungers are reinforced with a refractory metal such as tungsten or molybdenum.

Another procedure which permits very efficient utilization of a hot press involves use of sintered or heat-treated powder in which tungsten is dissolved in the cobalt phase. Such powder is ordinarily heat-treated in a separate furnace and then stored ready for use. It is loaded into a graphite mold, pressure is applied at a convenient temperature such as 800 to 1000° C. and application of pressure is continued as the temperature is raised as rapidly as practicable to the prescribed maximum. The prescribed maximum temperature and the pressure are maintained for the minimum time required to eliminate porosity in the body, but for not over 20 $t_m$ minutes, and the consolidated body is then removed from the hot zone. This procedure requires a minimum of time in the hot press and has the further advantage that the pressure is applied over a longer period of time, resulting in lower porosity.

Instead of loading a powder into a mold, preconsolidated compacts in the form of billets can be prepared and heat-treated and then loaded in a mold for hot pressing. Such heat-treated, sintered billets can also be shaped by rolling or forging in an inert atmosphere.

After final consolidation to a dense billet the compositions can be further shaped by bending, swaging or forging at about temperature $T_m$ in an inert atmosphere. Similarly, pieces can be welded together by bringing two clean surfaces together under pressure.

After the bodies are hot pressed, the sample is removed from the hot zone of the furnace and allowed to cool. The surroundings are at ordinary temperature and the sample cools from white heat very rapidly to dull red heat in a minute or so, and is below 700° C. in less than five minutes. As stated previously, the cooling rate may be as rapid as around 300 degrees per minute.

If the sample is left in the furnace and cooled at 5 degrees per minute from 1400° to 700° C., the transverse rupture strength of the cooled product is appreciably less than that of an otherwise identical product which was cooled more rapidly. Preferably it is cooled at a rate faster than 10 degrees per minute. The difference in strength is at least 10 percent. Part of the outstanding strength of the product is therefore due to the fact that it is always cooled rapidly. Such a product is said to be "unannealed" or "quench strengthened." If a hot compact is cooled slowly or "annealed," its strength can be brought back up to normal by reheating and cooling rapidly as described above.

Such rapid cooling, particularly in the range above about 1300° C. is most essential for compositions which are especially susceptible to grain growth, namely those having an atomic ratio of carbon to tungsten greater than 0.99.

Additional methods of fabrication are of course suitable to achieve a high degree of orientation for anisodimensional tungsten carbide platelets. These include orienting the platelets after fabrication such as by hot swaging, and orienting the platelets during fabrication such as by hot extrusion.

Thus when the crystallization of the colloidal tungsten carbide powder admixed with metal has reached the point where platelets are present, the latter may be oriented in a preferred direction by subjecting the plastic mass to shearing forces.

The particular method selected for bringing about the orientation depends upon such factors as the metal content of the composition. Compositions containing about 10% or more of metal can be oriented by extrusion, and those containing more than about 25% of metal can be oriented by hot rolling, providing not too great a reduction in thickness is attempted per pass. The degree of orientation in extruded rods may be further improved by swaging, particularly in compositions containing more than about 20% metal. Other methods of obtaining orientation are by hot forging or hot coining.

It is important that orientation be accomplished before tungsten carbide recrystallization has proceeded to a stage in which the platelets have grown together into a rigid, three-dimensional network of tungsten. Subsequent deformation of such a mass during molding tends to cause fracturing of the carbide network which reduces the strength of the final body. In some instances, the platelets in the network can be broken apart sufficiently to be oriented, but if recrystallization has been essentially completed, the oriented platelets do not grow together into a new network. In compositions where recrystallization to platelets has been completed, the mass may be broken up and reduced to a powder that will pass a screen of 100 meshes per inch, and then mixed with more of the original powder that has not yet been heated; the mix can then be heated and molded before the added powder has completely recrystallized.

If additional shaping is required to prepare the dense body in the form of a shaping tool, it can be performed by means well-known to the art using a diamond saw or grinding wheel. The shaping tool, comprising a working surface of a dense composition prepared as described above, may consist of metal parts brazed, welded, or otherwise joined together, with the working surface the only portion of the tool which is tungsten carbide bonded with tungsten-cobalt alloy. The working surface can be sharpened by methods also well-known to the art with configuration or angle of the edge being custom suited for the particular use application.

Methods of Characterization

The dense compositions prepared as described above can be charocterized by the methods described in application Ser. No. 660,986 filed Aug. 16, 1967. These methods include chemical analysis, examination with optical microscope, measurement of transverse rupture strength, magnetic characteristics and acid resistance, and an annealing test. In addition, the cutting edge of the tools of this invention can be tested for its characteristics by the following methods.

(1) Examination with electron microscope.—Because of the unusually fine-grained structure of the working surface of tools of this invention in which over half of the grains of tungsten carbide are frequently smaller than 0.75 micron in diameter, it is necessary to use the electron microscope to measure the grain size. In order to measure the grain size of tungsten carbide both the boundaries between tungsten carbide grains and the tungsten carbide-metal phase boundaries must be outlined. Furthermore, the metal phase must be distinguished from tungsten carbid so that the former can be avoided when counting the grain size of tungsten carbide. A multi-step chemical etch accomplishes this objective. The following procedure is employed in characterizing the products of this invention.

(1) A flat, small surface, about 8 to 200 mm.², representative of the structure of the working surface, is mounted in bakelite or epoxy or other suitable potting material which is not attacked or softened by solutions used for subsequent etching, cleaning, or replicating.

(2) The sample surface is polished in a conventional manner through 1 micron size diamond to provide an essentially scratch free surface.

(3) The clean, dry, polished surface is etched by swabbing 10 seconds with cotton saturated with a solution of 10 grams of potassium hydroxide and 10 grams of potassium ferricyanide in 100 cc. water, followed by thorough water rinsing, alcohol rinsing and drying in a warm air blast. This etches boundaries between tungsten carbide grains and tungsten carbide-metal phase boundaries.

(4) The cobalt-rich metal phase is etched next by immersion in a solution consisting of 20 percent hydrochloric acid and 80 percent ethyl alcohol, usually for 3 or 4 minutes. Since the rate of dissolution of the metal phase depends on alloy composition, the optimum etch time may vary for different samples, and may be adjusted as necessary to provide the best grain definition.

(5) For electron microscopy a two stage replica is made of the etched surface. The negative is taken by cellulose acetate solution. After drying, the replica is striped and shadowed with chromium at about 60° between shadow direction and plane of replica in order to highlight subtle roughness. Then it is coated with 500 to 700 angstroms of carbon by vacuum evaporation and deposition.

(6) Electron micrographs are taken on a representative area of the sample free from flaws and local heterogeneities such as cobalt-rich inclusions, coarse-grained areas around carbon inclusions, or localized concentrations of eta phase. A good quality electron microscope which has a resolution of at least 50 angstroms is used. Electron micrographs are taken on 35 mm. film at 1500 times magnification and enlarged to 20,000 times magnification on 11 inch by 14 inch printing paper.

On the prints, tungsten carbide grains are recognized by surface smoothness and frequent near-60° and near-90° angles between adjacent sides. The cobalt-rich metal phase occupies a minor proportion of the area (about 20% of the area for 12% cobalt by weight) and is generally roughened by the etch so that it has a pebble-type surface. Also, it has very irregular boundaries and small angles between adjacent sides as it fills between the tungsten carbide grains. The metal phase in the original sample, having been etched below the average plane of the tungsten carbide, is elevated relative to tungsten carbide on the negative replica. Hence, when the negative replica is shadowed with chromium, a short shadow is cast by the metal phase. Long shadows are cast by porosity or deep-etched pits or valleys and may be indicative of another phase, e.g., $Co_3W_3C$, which is not involved with grain size counting. In general, features which cause long shadows are to be ignored when counting tungsten carbide grain size.

The grain size and size distribution is determined from the enlarged electron micrograph following an extension of the method of John E. Hilliard described in "Metal Progress," May 1964, pp. 99 to 102, and of R. L. Fullman, described in the Journal of Metals, March 1953, p. 447 and ff. The etching and replication must be such that the electron micrograph permits one skilled in the art to distinguish between grains of tungsten carbide and areas of cobalt as small as about one-tenth micron.

Figure 9:
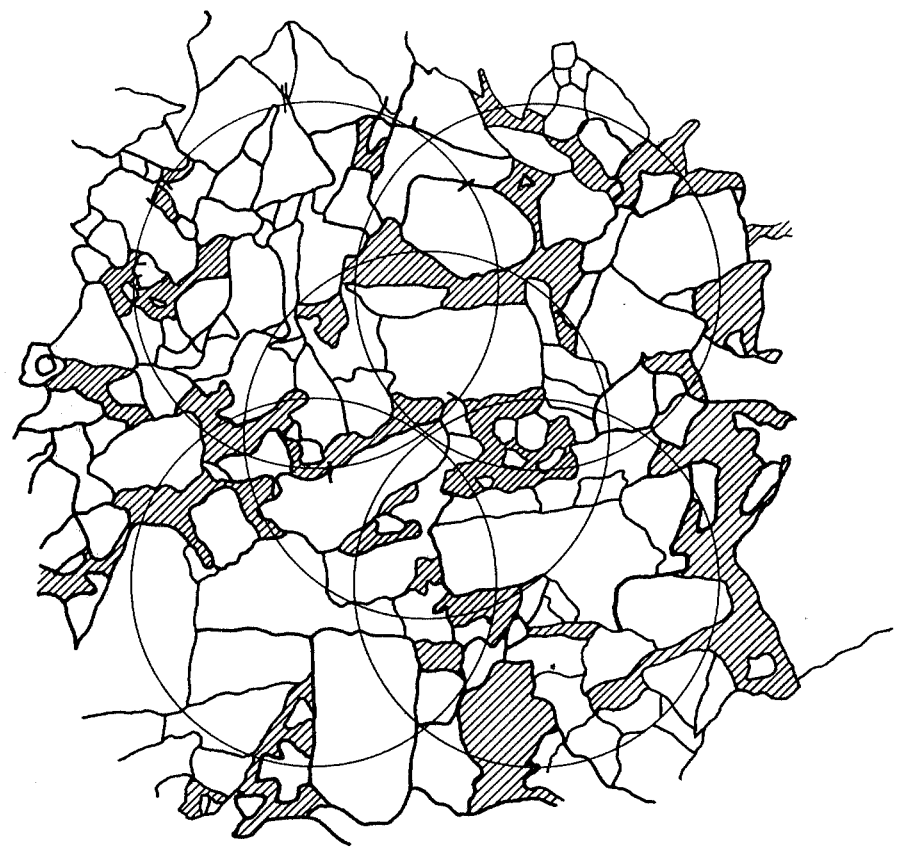
FIG. 9 is a drawing illustrating the method used for measuring the grain size of the products of this invention.

To core exactly define the methods used in characterizing the grain size of tunsten carbide in the cutting edge of the tools of this invention, an example of the procedure of measuring and calculating size is given below in detail. Five circles, each having a radius of 6.4 centimeters, are drawn in different areas of the micrographs printed at 20,000 fold magnification as illustrated at ½ scale in FIG. 9. The circumference of each circle corresponds to 20 microns on the micrograph. Thus the scale factor is one millimeter representing 0.05 micron. The intersections made on this circle by the boundaries between tungsten carbide crystals and the boundaries between tungsten carbide crystals and the cobalt binder phase are marked around the circumference of the circle as shown on the upper left circle in FIG. 9. In order to facilitate counting the tunsten carbide grains, the nitersections with the cobalt binder regions are marked with a heavy solid line as on the upper left circle FIG. 9. The intersections of the circumference with boundaries are marked on all five of the circles in the same manner as described for the circle above.

The length of the intersection on the circumference is measured for each of the tungsten carbide grains, and the measured lengths are tabulated in the following groups; 1–2 millimeters, 2–4 mm., 4–8 mm., 8–16 mm., 16–32 mm., and 32–64 mm. The numbers of grains in each of the size fractions for a typical product with unimodal size distribution is tabulated below:

| Millimeters | 1–2 | 2–4 | 4–8 | 8–16 | 16–32 | 32–64 | Total |
|---|---|---|---|---|---|---|---|
| Number of WC grains | 40 | 41 | 45 | 30 | 19 | 2 | 177 |
| Total lengths of intersections in millimeters | 61.5 | 129 | 273 | 344 | 438 | 70 | 1,315 |

The total length of intersections with tungsten carbide grains is obtained by adding together all the intersections measured, and this divided by the total number of grains gives an average intersect length as measured for a tungsten carbide grain.

$$\text{Average intersect length} = \frac{1315}{177} = 7.4 \text{ millimeters}$$

Multiplying by the scale factor 0.05 micron per millimeter, the average intersect length $d_m$, is 0.37 micron. This is converted to average grain diameter $d_a$, by the formula of Fullman:

$$d_a = \frac{\pi}{2} d_m$$

In this example $$d_a = \frac{\pi}{2}(0.37) = 0.58 \text{ micron}$$

The distribution of grain sizes can be calculated from the numbers of particles below a series of specified sizes. For example, about 63% of all the particles in the foregoing example are smaller than half a micron, 83 percent are smaller than one micron, and 99 percent were under 2.5 microns.

(2) Tungsten content of the cobalt.—A preferred method for measuring the tungsten content of the cobalt in the working surface of tools of this invention is to polish a section of sample; remove tungsten carbide by anodic etching for an hour in a solution containing ten percent by weight of potassium hydroxide and ten percent of potassium ferricyanide; rinse; and remove the residual metal binder layer by dissolving it in a ten percent solution of hydrochloric acid; then again etch to remove tungsten carbide, thus leaving a film of metal binder a few thousandths of an inch in thickness. This film is then examined by X-ray diffraction and the lattice constant of the cobalt determined. The percentage of tungsten in the cobalt is calculated, based on the information given in "Handbook of Lattice Spacings and Structure of Metals," vol. 1, page 528, Pergamon Press, 1958, by W. B. Pearson. When no tungsten is present, the lattice constant of cubic cobalt is 3.545 angstroms, and when the initial binder contains 21% by weight of tungsten and 79% by weight of cobalt in solid solution, the lattice constant is 3.570.

I have found that the metal binder phase may be isolated by electrolytically etching a body of the invention, using it as an anode, in the potassium hydroxide, potassium ferricyanide solution for 24 hours at a current density of 3 amperes per square inch, then rinsing in water and removing the layer of cobalt alloy (which is from 0.005 to 0.010 inch thick), and drying it at 60° C. under nitrogen. The tungsten content determined by X-ray diffraction from powder patterns, corresponds within the limit of error to the ratio of weights of tungsten to tungsen plus cobalt, determined by chemical analysis, providing no substantial quantity of $Co_3W$ or carbide phases are present. In this recovered metal phase, tungsten carbide and cobalt-tungsten carbide phases such as eta, $Co_3W_3C$ are determined by heating the sample in 35% hydrochloric acid at 80° C. for one hour, filtering and weighing the washed and dried insoluble residue which will contain the said carbides which are insoluble. If the intermetallic compound $Co_3W$ is present, it will dissolve in the acid, but it is seldom present in the working surface of shaping tools of this invention.

(3) Degree of orientation.—As stated previously when the metal-bonded anisodimensional tungsten carbide compositions are hot worked, extruded, or otherwise subjected to shearing forces by flow, there results a preferred crystallographic orientation in the product. By this is meant a predominant orientation or lattice alignment as observed by crystallographic examination, as well as by micrographic examination of polished cross-sections of the compositions taken at right angles to each other.

When a rod is formed by extrusion, the faces of the tungsten carbide platelets will have a preferred alignment parallel to a common line, which, in this instance, is the central axis of the extruded rod. On the other hand, when a billet is flattened, such that there is a plastic flow or deformation, the faces of the platelets will have a preferred alignment parallel to a plane at right angles to the pressing direction, but the platelets will also be parallel to any line on the plane. Thus, most broadly the alignment may be parallel to a line; or, expressed more specifically, to a referent selected from the group of a line and a plane. More narrowly the alignment may be parallel to a plane.

The preferred orientation of the tungsten carbide can be described by reference to the orientation of a crystallographic plane having such Miller Indices as, for example, (001). Thus when a billet is flattened under pressure, the platelets tend to become oriented with their faces perpendicular to the pressing direction. In such platelets, the orientation is such that the basal plane (001) is at right angles to the pressing direction.

A beam of X-rays parallel to the pressing direction will thus be perpendicular to the face or the (001) basal plane of a platelet that is oriented as described above. There is no recorded reflection (i.e. no diffracted beam) from the (001) plane under these conditions but two other planes with Miller Indices of (113) and (103) in the tungsten carbide crystal give characteristic strong back reflections.

Figure 2:
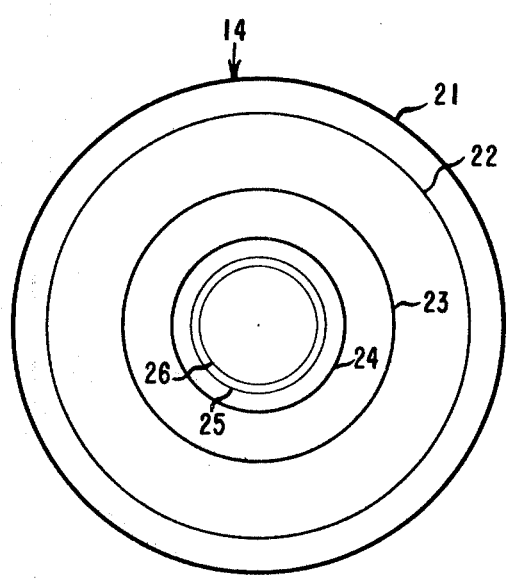
FIG. 2 is a representation of the X-ray diffraction pattern taken on film 10 in FIG. 1.
Figure 3:
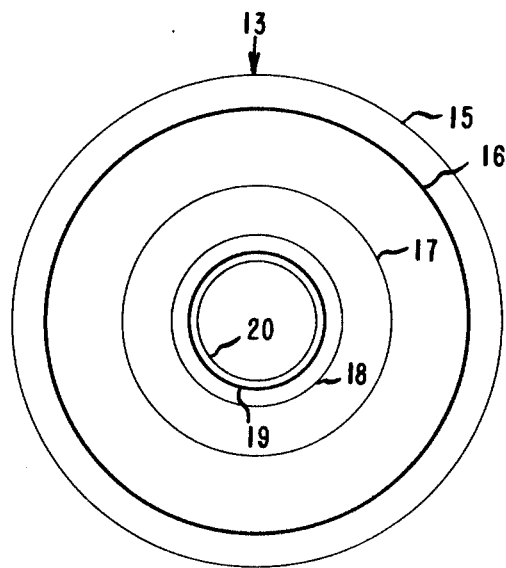
FIG. 3 is a representation of the X-ray diffraction pattern taken on film 7 in FIG. 1.

This may be more clearly understood by reference to FIGS. 1, 2 and 3.

In FIG. 1, a monochromatic beam of X-rays 1 is being projected at right angles to the surface of the cube 2, in a direction parallel to the original pressing direction. Another beam of X-rays 3, is being projected at right angles to 1 and in a direction perpendicular to the original pressing direction. The face of a representative triangular platelet 4 of anisodimensional tungsten carbide is shown magnified many times, on the surface impinged upon by X-ray beam 1. The edge of a representative triangular platelet 5 of anisodimensional tungsten carbide is shown magnified many times, on the surface impinged upon by X-ray beam 3. From X-ray beam 1 a cone of back-reflected X-radiation is shown registering on a photographic film 7, which after development is visible as concentric ring images at 8. Similarly from X-ray beam 3 a cone of back-reflected X-radiation is shown registering on a photographic film 10 which after development is visible as concentric ring image 11, while other X-radiation cones not shown produce concentric ring images 12.

In FIGS. 2 and 3 the diffraction pattern of concentric ring images recorded on film 10 of FIG. 1 are shown in pattern 14 while the diffraction pattern of film 7 is shown in pattern 13. The circular lines of pattern 13, shown at 15, 16, 17, 18, 19 and 20 and the circular lines of pattern 14 shown at 21, 22, 23, 24, 25, and 26 depict the variation in intensity of the X-radiation reflected from the planes with Miller Indices described above.

Lines 15 and 21 arise from the (211) crystal planes of tungsten carbide, 21 being the stronger. Lines 16 and 22 arise from the (103) crystal planes, 16 being stronger. Lines 17 and 23 arise from the (300) planes, 23 being stronger. Lines 18 and 24 arise from the (301) crystal planes, 24 being stronger. Lines 19 and 25 arise from the (113) crystal planes, 19 being stronger. Lines 20 and 26 arise from the (212) crystal planes, the intensity being about the same.

Thus, by measuring the relative intensities of the interference lines, which, in turn, correspond to specific crystallographic planes, it is possible to estimate the degree to which the orientation of the platelets approaches an ideal or perfect orientation in which all platelets would lie perfectly parallel to each other.

In a composition which has been oriented by extrusion through a round orifice to form a rod, the preferred orientation is such that the platelets of tungsten carbide lie with their faces parallel to the central axis of the rod. In this case if a cross-section of the rod at right angles to its axis is examined by projecting a beam of X-rays at right angles onto the surface of the cross-section, the X-rays diffracted from the (301), (300) and (211) planes will be relatively stronger, while those from the (113) and (103) planes will be weaker than when the platelets are randomly disposed.

For a more complete description of preferred orientation in metal, reference is made to "Structure of Metals," C. B. Barrett, McGraw-Hill (1952), Chapters XVIII and XIX. Orientation can also be determined by standard X-ray diffraction techniques using the well known reflection method employing an X-ray diffractometer developed by Schult. This method is described in "Elements of X-ray Diffraction," B. O. Cullity, Addison-Wesley (1956), pages 29–295. Other accepted methods can, of course, be used.

In the working surface of tools of this invention in which anisodimensional tungsten carbide is oriented, the X-ray diffraction lines of tungsten carbide corresponding to the crystallographic planes having Miller indices of (113) and (103) and of (301), (300) and (211) exhibit different intensities when measured from two suitably selected surfaces of the composition lying at right angles to each other. If the direction of orientation is not known, it is necessary to measure the intensity of these lines reflected from two test surfaces at right angles to each other cut on a specimen over a range of orientations until maximum differences are found. This is a tantamount to establishing a pole figure.

The degree of orientation of the tungsten carbide grains can be indicated in approximate terms as the ratios of the relative intensities of the diffraction lines corresponding to different crystallographic planes when measured on two polished flat surfaces of a specimen, at right angles to each other, the surfaces being respectively parallel to and at right angles to the average direction of orientation of the platelets.

Figure 4:
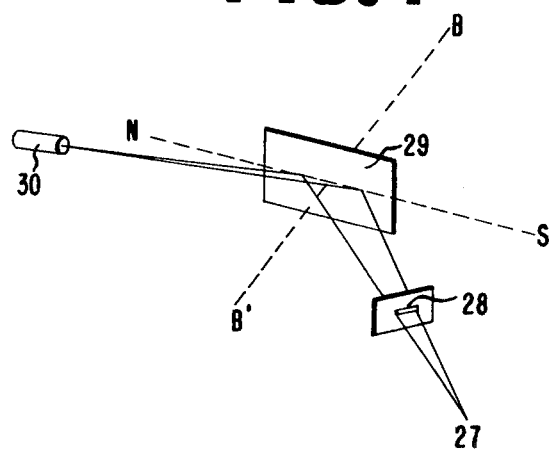
FIG. 4 is a schematic representation of the reflection method for pole-figure determination.

Most preferably, oriented bodies are characterized by what is referred to as pole figure determination. This method of analysis is described in Cullity's "Elements of X-Ray Diffraction" at page 290. As pointed out there, and as represented in FIG. 4, pole figures are obtained when an incident X-ray beam passes from a source 27 through a slit 28 and is reflected from the surface 29 of the subject being analyzed. The intensity of the reflected beam is measured by a counter 30. The equipment is so adjusted that at all times the counter measures only the intensity of the beam reflected from the (001) basal plane of the tungsten carbide crystals. To determine the differences in reflected intensity from different positions of the sample, the sample holder rotates the surface of the sample in its own plane about an axis BB' perpendicular to the surface at its center point, and also rotates the surface of the sample about a horizontal axis NS bisecting the specimen surface.

Thus while the surface is continually rotated around BB' it is also slowly tilted through angle $\alpha$ around axis NS and the intensity of the reflected X-ray beam is measured for the various positions of the surface. The data thus received are plotted in the form of a pole figure as shown in FIGS. 5, 6, 7 and 8. In these figures, each contour-like line represents a line of equal intensity of the reflected beam. Different levels of intensity are represented by different colors.

The pole figure intensities are related directly to the position of the surface of the sample through the position of the axis BB' which is perpendicular to the plane of the pole figure at its center; the axis NS is in the plane of the pole figure as marked; and the angle of rotation $\alpha$ from 0° to 70° plotted as a series of concentric circles of increasing diameter.

Figure 8:
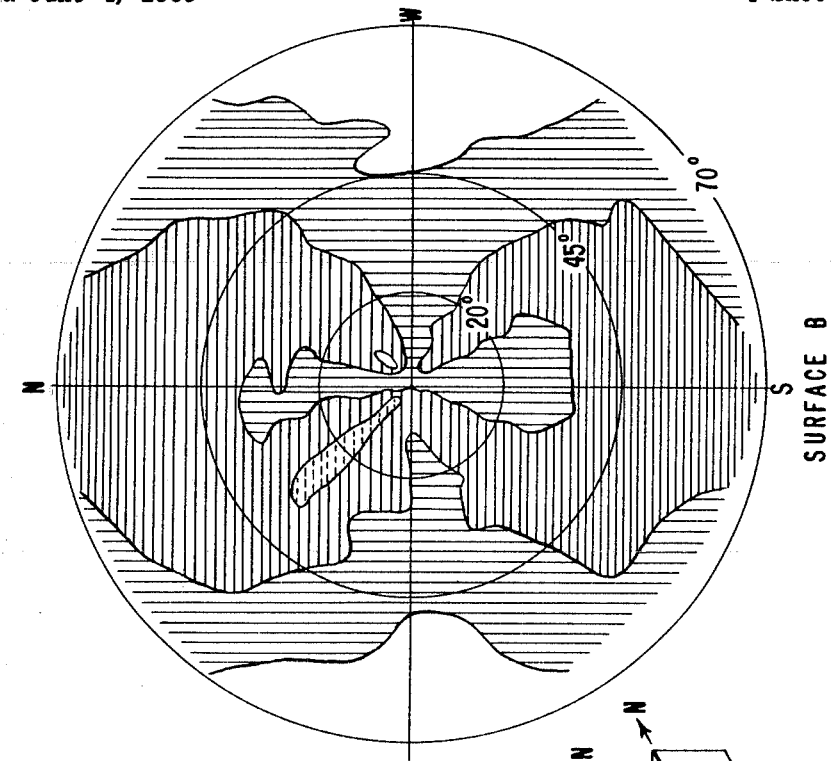
FIGS. 7 and 8 are representations of actual pole-figure patterns made on a cobalt-bonded oriented tungsten carbide body of this invention.
Figure 7:
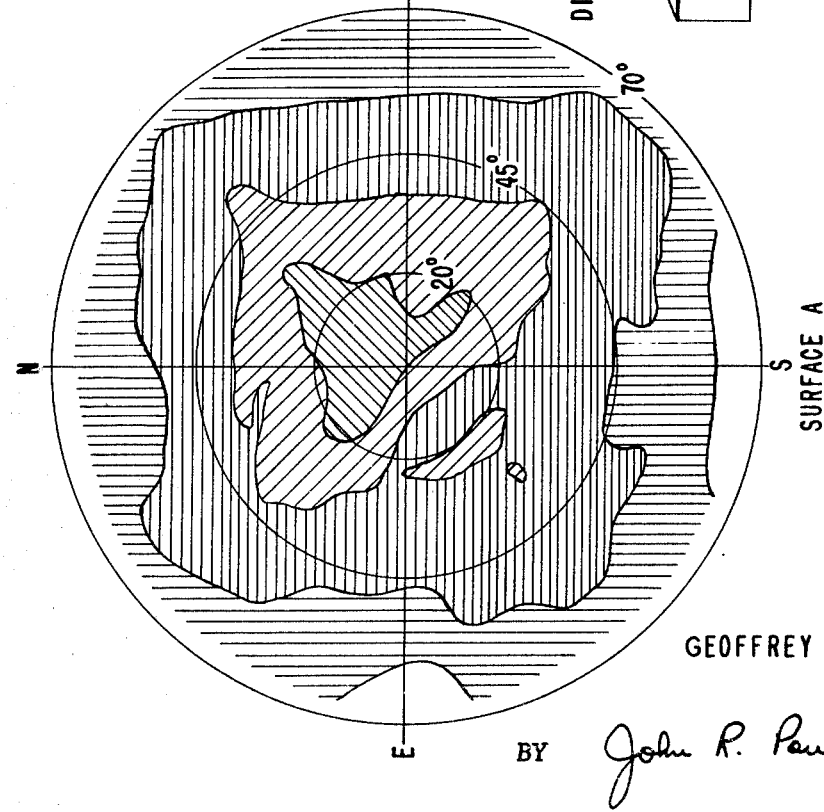

To complete the analysis of structural orientation it is necessary to obtain pole figures from two surfaces of a sample, which are at right angles to each other, one surface perpendicular to the pressing direction represented by FIGS. 5 and 7, and one surface parallel to the pressing direction represented by FIGS. 6 and 8. In each figure the pressing direction is indicated by an arrow.

FIGS. 5 and 6 are illustrations of pole figures of non-oriented metal bonded tungsten carbide. The nonorientation is demonstrated in the pole figures in that the faces at right angles to one another are both symmetrical, have essentially the same shape and have similar intensities. The intensities when integrated over the range of 0 to 30° vary less than 20% for the two faces. And the intensity when integrated along the line NS from 45° to 70° in FIG. 6 is essentially equal to the intensity integrated along the line EW from 45 to 70° in the same figure.

By contrast, FIGS. 7 and 8 are illustrations of pole figures obtained from a substantially oriented structure of this invention. The differences in the figures obtained from faces at right angles to one another are markedly apparent. The intensity integrated over the angle of 0 to 30° in FIG. 7 is more than 100% greater than the integrated intensity from 0 to 30° in FIG. 8. Also the integrated intensity along line NS from 45 to 70° in FIG. 8 is more than 100% greater than the intensity integrated along line EW from 45 to 70° in the same figure.

These differences in integrated intensities are apparent only when the pole figure subject has a substantially oriented structure. Substantial orientation is therefore defined as follows: (1) that crystal arrangement which displays an integrated intensity from 0 to 30°, for a pole figure determination of a surface of a pressed body which is perpendicular to the pressing direction, which is more than 100% greater than the integrated intensity from 0 to 30° of a pole figure determination of a surface of the pressed body which is parallel to the pressing direction; or (2) that crystal arrangement which displays an integrated intensity from 45 to 70° along its NS axis which is more than 100% greater than the integrated intensity from 45 to 70° along its EW axis by pole figure determination of a surface parallel to the pressing direction.

(4) Density.—The actual density of a given composition is measured on a convenient sized sample by weighing the sample in air and immersed in water which has been boiled to remove dissolved air. Density is then calculated by the equation $$d = \frac{w_1 \times s}{w_1 - w_2}$$

where:

$d$=actual density in grams per cubic centimeter,
$w_1$=weight in grams in air,
$w_2$=weight in grams in water, and
$s$=specific gravity of water at the temperature of measurement.

The theoretical density of the composition is then calculated from the equation $$t = \frac{1563s}{cs + 15.63(100 - c)}$$

where:

$t$=theoretical density in grams per cubic centimeter,
$c$=weight percentage of tungsten carbide, and
$s$=specific gravity of the tungsten-cobalt alloy phase.

(5) Angle of cutting edge.—The included angle of a cutting edge can be measured by projecting the profile of the edge onto a profilometer screen and using a protractor to measure the angle between the two faces which intersect at the cutting edge.

Utility

The working surfaces of shaping tools of this invention are extremely hard and strong.

For example, anisodimensional platelets of tungsten carbide 0.05 to 2 microns in thickness and from about 0.2 to 10 microns in breadth substantially oriented in 10 percent by weight of cobalt, based on the weight of the total composition, said orientation obtained by hot-pressing in accordance with the methods previously disclosed, exhibits a hardness of 91.5 Rockwell A and a transverse bending strength in a direction parallel to the direction of the tungsten carbide platelets of about 550,000 p.s.i. Such a body when shaped into cutting tips and brazed onto a commercial vibratory drill can cut more than three times as far through granite as commercially available tips of the same chemical composition before resharpening is required.

The working surfaces of shaping tools of this invention are extremely dense, impact resistant, wear resistant, extremely hard, resistant to attack by acids, and are very strong. They are therefore suitable for use in shaping operations in which such properties are of particular advantage.

Shaping tools comprising a cutting edge of oriented structures of anisodimensional tungsten carbide platelets from .05 to 1 micron thick and from .2 to 4 microns long bonded with 8 to 15% cobalt are particularly effective for use in metal removal such as form cutting, cut-off, milling, broaching and grooving.

The shaping tools of this invention are used in operations in which unusual strength is required in combination with high hardness. They are particularly advantageous for uses in which conventional cobalt-bonded tungsten carbide tools fail by flaking, chipping, or cracking. Thus they find extensive use where high speed steel tools are still employed because of the inadequacies of cobalt-bonded tungsten carbide tools of the prior art.

Because of the unusual fine-grain size in the working surface, tools of this invention are useful where extremely small cross-sections are encountered, as for example, in rotary tools smaller than an eighth of an inch in diameter such as end mills, drills and routers; knives having a cutting edge with an included angle less than about 30°; and steel-cutting tools which cut with high rake angles such as broaches, thread chasers, shaving or planing tools, rotary drills, end mills, and teeth for rotary saws. While the tools of this invention comprising a working surface containing more than about 15% cobalt are not stronger than tools of this invention comprising a working surface containing from 8 to 15% cobalt, nevertheless, the impact strength and toughness of the former is higher. These former tools are generally useful where tool steels are normally employed, and have the advantage of higher hardness. For highest impact strength, tools with a working surface containing from 15 to 30% cobalt are employed, as in dies and punches to be used under the most severe conditions. For many operations involving metal punching, such as heading of bolts, where high impact strength must be balanced with high wear resistance, the working surface preferably contains 8 to 15% cobalt. For wire drawings even greater wear resistance is desirable so cobalt levels of 3 to 8% are preferred.

In order to more fully illustrate the invention the following examples are given wherein parts and percentages are by weight unless otherwise noted.

EXAMPLE 1

Twenty-two thousand seven hundred parts of calcium chloride are melted and brought to 985° C. in a carbon crucible, maintaining an atmosphere of argon in the system. To the melt, continuously agitated with a carbon stirrer, are added, simultaneously through separate hoppers attached to the head of the reactor, charges of (a) 243 parts of a blended mixture consisting of 230 parts of tungstic oxide and 13 parts of carbon having specific surface areas of 5 and 340 square meters per gram, respectively prefired for 4 hours at 750° C. under argon to remove water, and (b) 120 parts of pure granulated calcium metal. The charging hoppers are fitted with a double valve system, to exclude the atmosphere when introducing the reactants. Twenty additions of each of the materials (a) and (b) are charged at 3 to 4 minute intervals over a period of 1.5 hours, the temperature being maintained in the range between 990–1000° C. After the addition of all the reactants, the melt is maintained at temperature, with stirring, for a further twenty minutes, and is then drained from the carbon crucible into an Inconel bucket, maintaining an atmosphere of argon throughout, and allowed to solidify and cool. The solid cake, which has contracted away from the walls of the bucket, is removed and divided into two portions. The dark layer at the bottom of the solid cake is rich in tungsten carbide, whereas the upper, lighter gray portion is low in tungsten carbide, and contains considerable amounts of free carbon and oxide. The lower portion of the solid cake is broken into coarse pieces which are charged to a polyethylene tank and 23,000 parts of water are then added. The pieces of salt cake are leached by continuously agitating the water in the tank and adding ice as necessary to keep the temperature below 85° C. When the initial temperature rise due to hydration is complete, concentrated hydrochloric acid is added in 1200 part increments. As the cake disintegrates, dissolves, and reacts, the pH decreases from strongly basic to acidic values. Because of the high salt concentration in the slurry, actual pH values are higher than those which are measured. Sufficient acid is added to lower the pH to slightly less than one. When a pH of 1 is achieved and maintained, with continuous agitation, for 15 minutes, the stirring is discontinued and the salts are allowed to settle. The supernatant liquid is siphoned off and the sludge washed through a 100 mesh screen into a second polyethylene tank. Material retained on the screen is discarded and the sludge is diluted to about 38,000 parts with distilled water having a pH between 6 and 7 and a specific resistivity greater than 100,000 ohms per centimeter, and the resultant slurry is agitated for 15 minutes. More hydrochloric acid is then added until the pH is finally stabilized at 3, in the well-stirred slurry. The stirring is discontinued, the solids are allowed to settle and the supernatant liquid is siphoned off, as before. The washing operation is repeated until the specific resistivity of the stirred slurry is between 2500 and 5000 ohms per centimeter, which requires five washings. After removing the final supernatant liquid, the aqueous sludge is diluted with an equal volume of acetone, the solids are allowed to settle, and the supernatant liquid is decanted. The washing of the sludge with acetone is repeated three times. The acetone-rinsed sludge is transferred to shallow metal trays and the acetone is evaporated in a vacuum oven using a purge of pure nitrogen. After the bulk of the acetone is evaporated, the trays are heated to 80° C. to completely dry the powder. The oven is cooled to 40° C., filled with nitrogen, and the dried product is removed and screened through a 100 mesh sieve. Three thousand two hundred fifty parts of tungsten carbide powder are recovered, corresponding to an overall yield of 84% of theoretical.

By analysis this powder contains 93.5% tungsten, 6.05% total carbon, less than 0.1% free carbon and 0.3% oxygen.

The product gives the X-ray diffraction pattern of tungsten carbide and from the broadening of the X-ray lines, the average crystallite size is calculated to be 31 millimicrons. The specific surface area is 7.1 square meters/gram.

Electron microscopic examination of the powder shows it to consist of porous aggregates of colloidal crystallites in the size range 20 to 50 millimicrons. The aggregates are mainly in the size range of from 1 to 10 microns, although some aggregates as large as 50 microns can be observed.

This material will hereafter be referred to as aggregated colloidal tungsten carbide powder.

Incorporation of the bonding phase is accomplished by milling the bonding metal in powder form with tungsten carbide powder. To an 8 inch diameter, 1 gallon steel mill the following are charged: (a) 14,000 parts of "Carboloy" grade 883 cobalt bonded tungsten carbide rods, ¼ inch in diameter, and ¼ inch long, the rods being previously conditioned by tumbling for two weeks; (b) fifteen hundred parts of the aggregated colloidal tungsten carbide powder prepared above; (c) 205 parts of Cobalt F, a fine cobalt powder having a specific surface area of 0.7 square meter per gram and a grain size of about 1 micron; and (d) 1185 parts of acetone. This charge occupies about ½ the volume of the mill. Milling under acetone is continued for 7 days by rotating the mill at 45 revolutions per minute, after which time the mill lid is replaced by a discharge cover and the contents are transferred to a container under a nitrogen atmosphere. Three portions of acetone of 395 parts each are used to wash out the mill. The solids in the drying flask are allowed to settle and the bulk of the acetone is siphoned off. The flask is then evacuated and when the bulk of the acetone is evaporated, the temperature of the flask is brought to 125° C., maintaining a vacuum of less than a tenth of a millimeter of mercury. After about 4 hours, the flask is cooled, filled with pure argon and transferred to an argon glove box. In this inert environment the solids are removed from the drying flask and screened through a 70 mesh sieve.

As an alternative, the mill lid can be replaced by a cover attached to a vacuum system with condensing trap and the acetone is removed under vacuum at a temperature of about 95 to 100° C. maintained on the mill walls by live steam. After the acetone has been removed, as indicated by a vacuum of 0.1 millimeter of mercury maintained in the mill, the mill is filled with nitrogen, the milled powder is recovered from the milling medium and removed under a nitrogen atmosphere. The powder is then screened under nitrogen as before.

The analysis of this unreduced powder mixture indicates that there is present 12.0% cobalt, 0.2% free carbon, and 5.45% total carbon of which some is due to adsorbed polished flats at right angles, one being parallel to the average direction of orientation of the platelets is indicative of orientation.

EXAMPLE 2

To a steel mill are charged 14,000 parts of "Carboloy" grade 883 cobalt-bonded tungsten carbide rods, previously conditioned as described in Example 1, 1800 parts of a fine commercial tungsten carbide powder and 1450 parts of acetone.

The tungsten carbide powder has a nitrogen surface area of 0.66 square meter/gram which corresponds to an average particle size of 580 millimicrons. By X-ray line broadening the average crystallite size is 370 millimicrons. Examination of the powder with an electron microscope reveals dense aggregates in the size range of from 2 to 10 microns, the aggregates being comprised of rough-surfaced particles in the size range of from 0.5 to 2 microns. Chemical analysis of this powder gives the following percentages: tungsten 93.2%; total carbon 6.32%; oxygen and free carbon, less than 0.1%.

Milling under acetone is continued for 7 days, as described in Example 1. One hundred eighty parts of fine cobalt powder are then added to the mill, maintaining an atmosphere of nitrogen in the mill while this is being done, and milling is continued for a further 7 days, the mill being then discharged and the dry powder product recovered and screened through a 70 mesh sieve without exposure to the atmosphere, as described in Example 1.

Prior to adding the cobalt, a small sample of the tungsten carbide-acetone slurry is removed and the dry powder is recovered without exposure to the atmosphere. The nitrogen surface area of this powder is 5.0 square meters/gram, corresponding to an average particle size of 75 millimicrons. By X-ray line broadening the average crystallite size is 50 millimicrons. By electron microscope the powder is seen to be a mixture of very fine particles, in the size range of 25 to 50 millimicrons, together with coarser fragments, in the size range of about 250 to 3000 millimicrons. 95% of the particles are less than one micron in size.

Removal of the cobalt from the milled dried cobalt-tungsten carbide composition, by dissolution in hydrochloric acid, and recovery of the tungsten carbide component, taking precautions to avoid contact with the atmosphere, gives a powder having a nitrogen surface area of 5.7 square meters/gram and an X-ray line broadening crystallite size of 32 millimicrons. This shows that only a small reduction in particle size results from milling the premilled tungsten carbide powder in the presence of cobalt.

The dried screened cobalt-tungsten carbide powder is heated at 900° C. for two hours in an atmosphere of hydrogen containing a small amount of methane as described in Example 1 and the resulting powder is discharged under argon as before.

The cobalt-containing tungsten carbide powder is characterized by analysis as follows: tungsten 85.7%; total carbon 5.53%; cobalt 8.5%; oxygen and free carbon less than 0.3%. The carbon content found by analysis corresponds to an atomic weight of carbon of 0.99 per atomic weight of tungsten. The nitrogen surface area is 3.6 square meters/gram.

Fifty parts of the above powder is charged in an oxygen-free environment to a cylindrical carbon mold, and close-fiitting carbon pistons are inserted in each end. The mold containing the powder pressed at 200 p.s.i. is then transferred to a vacuum hot press and inserted in the furnace at 1000° C. With no pressure applied to the pistons the sample is heated in the mold, by induction heating, to a temperature of 1400° C. over a period of seven minutes, and held at this temperature for five minutes, during which time the sample sinters to about 85% density.

At this point the tungsten carbide is in the form of isodimensional crystallities in the size range 50 millimicrons to about 2 microns, with 95% of the tungsten carbide crystallites being less than one micron. This is apparent from electron microscopic examination of the polished surface etched with alkaline potassium ferricyanide solution.

Hydraulic pressure is then applied to both pistons and the pressure on the sample in the mold is brought to 4000 p.s.i. in a period of half a minute. The sample is subjected to a pressure of 4000 p.s.i. at 1400° C. for one minute and the mold containing the sample is then ejected from the hot zone and allowed to cool to 800° C. in two minutes in the evacuated chamber of the press. After cooling to less than 100° C. the mold is removed from the vacuum chamber and a dense sample in the form of a cylindrical disc is recovered.

The modulus of rupture and hardness of the hot pressed composition are measured and found to be, respectively, 482,000 p.s.i. and 92.2 Rockwell A. The density is measured as 14.75 grams per cubic centimeter, which is 98.7% of theoretical density and corresponds to a dense composition containing 8.1% cobalt.

A fragment of one of the bars used in measuring physical properties is used to determine the tungsten content of the cobalt. The tungsten cobalt alloy binder phase contains more than 19 percent of tungsten in solid solution.

Detailed structural examination of both the hydrochloric acid and alkaline ferricyanide etched polished surfaces using both optical and electron microscopes shows that the hot pressed composition is a dense body with a few small pores, less than one micron in size and the porosity is designated A–2 on the ASTM porosity scale. The tungsten carbide is present as isodimensional crystals in the size range of 100 millimicrons to 5 microns, with 85% of the tungsten carbide crystallites being less than one micron and more than 50% less than 0.5 micron. The mean grain size of tungsten carbide is 0.6 micron, and the grain size distribution is unimodal.

The tungsten-cobalt alloy binder phase contains about 15% of tungsten in solid solution in the cobalt as determined from the lattice spacings.

A metal cutting tip, ½ inch x ½ inch x 3/16 inch thick is prepared from the dense hot pressed body as described in Example 1. The corners of this tip are ground to a nose radius of 31 mils.

The tip is used to cut gray cast iron by turning at a feed of 10 mils per revolution, a depth of cut of 63 mils, and a speed of 370 surface feet per minute. It cut for 60 minutes without failure.

EXAMPLE 3

A ball mill containing 14,000 parts of milling inserts similar to that of Example 1 is loaded with a mixture blended for four hours in a cone blendor and consisting of 1,260 parts of aggregated colloidal tungsten carbide powder of Example 1, 210 parts of tungsten powder having a crystallite size of about 0.2 micron by X-ray line broadening, and a nitrogen surface area of 2 square meters/gram, 630 parts of fine cobalt powder and 1,800 parts of acetone. Seven days of milling and drying the powder are carried out without exposing the powder to atmosphere or moisture.

Hot pressing is carried out by loading about 50 grams of powder into a 1 inch diameter mold and compacting with 200 p.s.i. pressure. The pressure then is removed and the sample is heated in the mold to 1000° C. and then from 1000 to 1350° C. in about 7 minutes. At this point, the sample is held at 1350° C. to sinter without pressure for 5 minutes, and then 2000 p.s.i. is applied for a period of one minute. Pressure is immediately removed and the sample is ejected from the furnace and cooled to below 600° C. in 5 minutes. The transverse rupture strength of the product is 601,000 p.s.i. and the hardness is 84.7 Rockwell A. The density organic matter; the specific surface area is 5.5 square meters per gram; and the oxygen content is 0.45%.

The screened powder is charged to shallow trays which are then loaded directly from the argon filled box to a five inch diameter Inconel tube furnace, where the powder is brought to 900° C. at a uniform rate in about 3 hours. The gas passing through the furnace consists of hydrogen, at a flow-rate of four liters per minute, with methane introduced at a flow-rate of forty milliliters per minute. The methane is present to minimize excessive decarburization of the tungsten carbide by the hydrogen. The powder is held in this gas stream at 900° C. for two hours then is cooled and passed through a 40 mesh per inch screen in an argon filled box. Samples are taken under argon for analysis.

The cobalt-containing tungsten carbide powder is characterized by analysis as follows: tungsten 82.3%; total carbon 5.33%; free carbon less than 0.1%; cobalt 12.1%; oxygen 0.26%. The carbon content found by analysis corresponds to an atomic weight of carbon of 0.99 per atomic weight of tungsten. X-ray diffraction line broadening corresponds to a tungsten carbide having a crystallite size of 42 millimicrons average diameter. The specific surface area is 2.6 square meters per gram.

Forty-five grams of the powder described above is charged in an oxygen-free environment to a cylindrical carbon mold and close-fitting carbon pistons are inserted in each end. The mold containing the powder pressed at 200 p.s.i. is then transferred to a vacuum hot press. After evacuation the sample, under no pressure, is brought to 1420° C. by induction heating in seven minutes and held at this temperature with no application of pressure for five minutes. During the heating the sample sinters and shrinks away from contact with the carbon surface, thus avoiding carburization.

At this point the tungsten carbide is in the form of platelets which are of a size when measured by optical microscope of up to a micron in thickness and up to several microns across, and are distributed randomly throughout a billet sintered to about 85 percent of theoretical density. Hydraulic pressure is then applied to both pistons and the pressure on the sample in the mold is brought to 4000 p.s.i. in a period of half a minute. The sample is subjected to a pressure of 4000 p.s.i. at 1420° C. for one minute at which time no further movement of the pistons is observed. The mold containing the sample is then ejected from the hot zone and allowed to cool to 800° C. in two minutes in the evacuated chamber of the press. After cooling to less than 100° C., the mold is removed from the vacuum chamber and a dense sample in the form of a cylindrical disc 1 inch in diameter is recovered.

The disc is cut into two segments, using a one hundred and eighty grit diamond saw, and one of the segments is further cut into bars for measurement of strength and hardness. The modulus of rupture of the hot pressed composition is 530,000 p.s.i., the unnotched impact strength on a Tinius-Olsen impact tester is 92 foot pounds/square inch, and the Rockwell A hardness is 91.8. The density of the hot pressed body is measured as 14.60 grams per cubic centimeter, this is 98.6% of theoretical density and corresponds to a composition containing 9.5% cobalt; the reduction in cobalt content as compared with the powder is due to the extrusion of some metal during fabrication.

Chemical analysis of the dense tungsten carbide body gives the following percentages: Tungsten 84.7%; total carbon 5.48%; cobalt 9.8%; oxygen and free carbon less than 0.1%. The carbon and tungsten content found by analysis corresponds to an atomic weight of carbon of 0.99 per atomic weight of tungsten.

A fragment of one of the bars used in measuring physical properties of the tungsten carbide body is optically polished on two faces, one face parallel to the direction of the pressing axis and the other face perpendicular to the direction of the pressing axis. The polished faces are then etched, using alkaline potassium ferricyanide solution, and examined in an optical microscope at a magnification of one thousand fold. Cross-sections of grains of tungsten carbide are visible as platelets with diameters of up to six microns and thicknesses of up to one micron. Most of the platelets visible through the optical microscope are oriented with their long axis perpendicular to the direction of the pressing axis. The porosity of the composition is estimated from the optical micrograph to be A–2 on the standard ASTM scale. More detailed examination of a cross-section of the structure parallel to the direction of the pressing axis with an electron microscope shows the long dimension of individual platelets ranging from 0.2 micron to 6 microns with more than 94 percent of the particles having a longest dimension less than one micron and more than 50% less than a half a micron. The platelets have a longest dimension:thickness ratio ranging from 3:1 to 6:1 and the overall average dimension of the platelet cross-sections visible in the electron micrograph is about 0.4 micron. This corresponds to an average tungsten carbide grain diameter of about 0.6 micron. Several sections of the same sample are examined and the mean grain size from one region to another ranges from 0.47 to 0.76 micron, the latter being characteristic of a region which appeared to contain more than a typical amount of cobalt. Non-representative regions such as those within a sixteenth of an inch of the outside of the billet or those surrounding occasional inclusions of impurities are not used in measuring the average grain size.

A sample of the metal binder phase is separated by etching away the tungsten carbide. The lattice spacing of the tungsten-cobalt alloy by X-ray diffraction is found to be 3.567 angstroms corresponding to about 18 percent of tungsten in solid solution in the cobalt. The metal binder phase is heated in 35% hydrochloric acid for 1 hour; the percentage of tungsten based on total weight of cobalt and tungsten dissolved, is 15 percent. About 2% of the alloy binder is insoluble and found by X-ray diffraction to consist of tungsten-rich eta phase, $Co_3W_3C$.

The second portion of the hot pressed disc is cut with a diamond wheel and ground to a piece one-half inch square and one-quarter of an inch thick, for use as a cutting tip in a milling head. The corners are ground to a radius of one thirty-second of an inch. Using a single tooth cutter, the tip is used to face mill a 2 inch wide bar of "Udimet" 500, at six and a half mils feed per tooth and sixty mils depth of cut. The tip mills the face of the bar a distance of 25 inches at a speed of 50 surface feet per minute before failure, and at 75 surface feet per minute, a distance of 27 inches is achieved.

Using a diamond wheel, a cube is prepared from the cutting tip in such a manner that one surface of the cube is perpendicular to the pressing direction. X-ray reflection pole figures of this surface and a second surface parallel to the pressing direction are obtained in the manner previously described. The pole figures are illustrated in FIGS. 7 and 8 with FIG. 7 corresponding to the cube surface perpendicular to the pressing direction and FIG. 8 corresponding to the cube surface parallel to the pressing direction.

The integrated relative intensity of the reflected beam over the angle 0 to 30° is calculated from the pole figures by summing the products of the relative intensity levels and the areas of the intensity plateaus between 0 and 30°. Thus the integrated intensity from 0 to 30° is 101.7 for FIG. 7 and 39.8 for FIG. 8. In FIG. 8 the relative intensity between 45 and 70° along the NS axis is greater than 2 and along the EW axis it is less than 1. These relative intensity figures show the anisodimensional tungsten carbide platelets in the pressed body are substantially oriented with their (001) basal plane in preferred alignment parallel to a common plane.

The relative intensities of diffraction lines corresponding to different crystallographic planes measures on two graphite mold out of contact with air. The powder contains 0.42% oxygen, has a specific surface area of 5.8 square meters/gram, the crystallite size of tungsten carbide determined by X-ray diffraction is 35 millimicrons, and the atomic ratio of carbon to tungsten is 0.97. The powder is compressed in the mold at 200 p.s.i., then the pressure is removed while the mold and contents are heated to 1400° C., at which temperature it is held for 5 minutes, and then 4000 p.s.i. pressure is applied through the pistons to the material for one minute. At once the pressure is removed and the sample ejected from the furnace and cooled to 800° C. in 2 minutes. The resulting body contains an atomic ratio of carbon to tungsten of 0.97 and contains 9.62% tungsten-cobalt alloy, some of the cobalt having been squeezed out of the mold. The density is 14.43 grams/cc., which is 98.4% of theoretical. The transverse rupture strength is 539,000 p.s.i. and the hardness is 91.6 Rockell A. The tungsten cobalt alloy binder phase contains 20% of tungsten. From electron micrographs the mean tungsten carbide grain size is 0.6 micron, and 90% of the tungsten carbide grains are less than one micron in size. The ASTM porosity is A–2.

Inserts made of this body are brazed into cutoff tools, ⁹⁄₁₆ of an inch wide, and employed on an automatic screw machine. In cutting off AISI 52100 steel, this tool cuts off three times as many pieces as a high speed steel cutoff tool before failure, while operating under cutting conditions under which inserts made with commercially available cobalt-bonded tungsten carbide are unreliable, failing by chipping.

EXAMPLE 9

A ball mill containing 14,000 parts of milling inserts similar to that of Example 1 is loaded with a mixture blended for four hours in a cone blender and consisting of 1260 parts of aggregated colloidal tungsten carbide powder of Example 1, 210 parts of tungsten powder having a crystallite size of about 0.2 micron, by X-ray diffraction line broadening and a nitrogen surface area of 2 square meters per gram, 630 parts of fine cobalt powder and 1800 parts of acetone. Seven days of milling and drying the powder are carried out without exposing the powder to atmosphere or moisture.

Hot pressing is carried out by loading about 50 grams of powder into a 1 inch diameter mold and compacting with 200 p.s.i. pressure. The pressure is then removed and the sample is heated in the mold to 1000° C. and then from 1000 to 1350° C. in about 7 minutes. At this point, the sample is held at 1350° C. to sinter without pressure for 5 minutes, and then 2000 p.s.i. is applied for a period of one minute. Pressure is immediately removed and the sample is ejected from the furnace and cooled to below 600° C. in 5 minutes. The transverse rupture strength of the product is 601,000 p.s.i. and the hardness is 84.7 Rockwell A. The density is greater than 98% of theoretical. The mean grain size of the tungsten carbide is 0.5 micron, and 90% of all the grains are less than 1 micron in size.

The dense body is fabricated as a drawing die for copper wire.

EXAMPLE 10

The commercial tungsten carbide employed in this example contains 6.33% carbon, 93.6% of tungsten, 0.05% of oxygen; the specific surface area of the powder as determined by nitrogen adsorption is 0.62 square meter/gram; and it contains less than 0.05% of iron, nickel and cobalt.

Four hundred grams of this tungsten carbide powder and 5.2 grams of the finely divided type of cobalt metal powder employed in Example 1 are placed in a one quart steel ballmill containing 3 kilograms of ¼ inch diameter by ¼ inch long cylinders of commercial tungsten carbide bonded with 6% cobalt, of the type used in Example 1. The mill is half filled with a saturated aliphatic hydrocarbon having a flash point of 130° F., the amount added to the mill being sufficient to just cover the carbide grinding media. The mill is run for 8 days, at 60 r.p.m., being tightly sealed during the period to prevent loss of solvent or intake of air. At the end of the milling period, the contents are washed out with normal hexane, while keeping the product out of contact with the atmosphere. The hexane suspension is permitted to stand until the black tungsten carbide-cobalt mixture has settled, the excess solvent then is removed by decantation and the residual black slurry is dried by distilling off the hydrocarbon under vacuum. The dried powder is then passed through a screen of 60 meshes per inch, and stored in a closed container. All the foregoing operations are carried out with the exclusion of air, and under atmosphere of nitrogen containing less than 50 p.p.m. of oxygen.

The tungsten carbide grinding cylinders, after being washed and dried, are found to have lost less than 20 grams in weight. The milled powder contains an average of 1.2% oxygen in spite of the precautions, has a specific surface area of 4.3 square meters/grams, and by X-ray analysis consists of tungsten carbide crystallites 19 millimicrons in average diameter. It contains 6.7% of carbon. The powder is then reduced by being heated at 950° C. for 2 hours in an atmosphere containing 15% argon, 83% hydrogen and about 2% methane, and is then allowed to cool in a stream of argon.

The resulting powder is handled and stored under nitrogen. The powder contains: carbon—6.00%; oxygen—0.22%; and the specific surface area is 1.6 square meters/gram. It consists of tungsten carbide crystallites of 30 millimicrons average size, according to X-ray line broadening. No free carbon is present and the atomic ratio of carbon to tungsten is about 0.99. Teh powder is passed under nitrogen, through a screen of 40 meshes per inch, and the fines removed through a screen of 100 meshes per inch. The resulting 40 to 100 mesh powder is vacuum hot pressed as follows: Fifty grams is loaded into a one inch diameter graphite mold and compressed between graphite pistons under a pressure of 200 p.s.i. and moved into the hot zone of the furnace at 1200° C. and the pressure immediately removed. The temperature is then raised at a uniform rate over a period of 6 minutes to 1800° C. where it is held for 5 minutes, after which a pressure of 4000 p.s.i. is applied for a period of one minute. During this time the material is finally consolidated. The molded material in its container is removed immediately from the hot zone and permitted to cool to about 1000° C. within a period of 2 minutes and to room temperature over a period of the next hour.

The product, hereinafter called product "A," has a transverse rupture strength of 230,000 p.s.i.; an impact strength of 11 foot pounds/square inch, a Rockwell A hardness of 92.3; and a density of 15.4 grams per cc., which is 100% of theoretical.

Another sample of the reduced powder which has been passed through a 40 mesh screen but from which the finer material has not been removed, is pressed in exactly the same manner and the resulting molded body has a transverse rupture strength of 235,000 p.s.i., an impact strength of 6 foot pounds/square inch, a Rockwell A hardness of 92.3, and a density of 15.40 grams per cc. Examination of the test body by X-ray diffraction indicates that it contains about 1% of eta phase, $Co_3W_3C$. As in product "A" there is about 1.3% alloy binder phase and there is 31 percent by weight of tungsten in the alloy phase.

For examination of the microstructure, a specimen is cut from the molded bodies in a plane parallel to the pressing direction. Examination of the polished and etched sections by metallographic microscope reveals that the structures consist largely of platelets of tungsten carbide from 2 to 5 microns in diameter and from 2 to less than 1 micron in thickness. The platelets are is greater than 98% of theoretical. The body is extremely resistant to acid, the acid resistance being over 200 hours. The mean grain size of the tungsten carbide is 0.5 micron, and 90% of all the grains are less than 1 micron in size. When the sample is subjected to the standard annealing test by heating to 1400° C. and cooling at the prescribed rate, it is subsequently found to have lost 10% of its transverse rupture strength. Examination of the microstructure shows that during the annealing step substantial amounts of the cobalt binder are converted by reaction with the tungsten carbide to a cobalt-rich type of eta phase.

The body is employed as a drawing die for copper wire. The composition is tough and resistant to impact.

EXAMPLE 4

Fifteen hundred and fifty parts of aggregated colloidal tungsten carbide prepared as in Example 1, 100 parts of fine cobalt powder and 1185 parts of acetone are charged to a steel mill containing 15,000 parts of cobalt bonded tungsten carbide rods described in Example 1. The charge is milled for 7 days and the cobalt-tungsten carbide powder of the invention is recovered, dried, screened and reduced as described in Example 1, except that the reduction temperature is 955° C. The powder contains tungsten=87.8%; total carbon=5.74%; free carbon less than 0.1%; cobalt=6.2%; and oxygen=0.16%. X-ray diffraction line broadening of this reduced powder corresponds to tungsten carbide having an average crystallite size of 51 millimicrons. The specific surface area is 1.9 square meters/gram.

Fifty parts of this powder is charged in an oxygen-free environment to a cylindrical mold with close fitting carbon pistons. The mold, containing the powder pressed at 200 p.s.i., is transferred to a vacuum hot press. After evacuation the sample is brought in six minutes to 1450° C. by induction heating with no pressure on the pistons, and held at this temperature with no pressure for 5 minutes. At this point, the tungsten carbide as observed by optical microscope at 500× is in the form of platelets up to one micron in thickness and several microns across, randomly distributed throughout the billet sintered to about 85% of theoretical density. Hydraulic pressure is then applied to both pistons and the pressure on the sample in the mold is brought to 4000 p.s.i. in a period of half a minute and held at this pressure at 1450° C. for one minute. The sintered billet is thus subject to hot working and densification and the mold containing the sample is then ejected from the hot zone and allowed to cool in the evacuated chamber of the hot press. The sample cools to 800° C. in two minutes and then to room temperature. The cool mold is removed from the press chamber and a dense sample in the form of a disc is recovered.

The disc is cut into two segments, one of which is cut into bars for measurement of strength and hardness. The modulus of rupture is 460,000 p.s.i., the unnotched impact strength is 97 foot pounds/square inch, and the Rockwell A hardness is 92.3. The density of the hot pressed body is measured as 14.92 grams per cc., which is 99.1% of theoretical density.

The hot pressed body contains tungsten=88.1%; total carbon=5.65%; cobalt=6.2%; free carbon and oxygen less than 0.1%. This analysis corresponds to 0.98 atomic weight of carbon per atomic weight of tungsten. Metallographic examination of the dense body by optical micrography, as described in Example 1, shows the presence of platelets of tungsten carbide having a length or breadth to thickness ratio of about 5 to 1. Examination by electron microscope shows that the longest dimension of the platelets seen in cross-section ranges from 0.4 to 10 microns with about 85 percent of the platelets having a longest dimension less than 1 micron. The platelets are highly oriented with the long axis perpendicular to the direction in which the pressure is applied in the hot press. In a cross-section parallel to the direction of pressing, the mean grain size of tungsten carbide is 0.7 micron. The alloy binder phase contains 24 percent of tungsten in solid solution in the cobalt.

The other portion of the hot-pressed disc finished to a cutting tip. When used to mill a high temperature alloy, at a feed rate of 6.7 mils per tooth and a depth of 60 mils, a distance of 12 inches is cut at a speed of 75 surface feet per minute, and 17 inches at 96 surface feet per minute, before the wear is sufficient for the tip to require replacement. The bar is milled across its full width of 2 inches.

EXAMPLE 5

As an example of molding a large billet, the reduced powder of Example 1 is cold pressed to a billet 3 inches in diameter and 1 inch thick, by isostatic pressing in a rubber mold at 50,000 p.s.i. The billet is then heated very slowly in a vacuum furnace in an alumina crucible and degassed by heating over a period of eight hours at a uniform rate of temperature rise to 1000° C. The billet is then cooled to room temperature and hot pressed while embedded in alumina in a graphite cylindrical mold, 3 inches in inside diameter, fitted with graphite pistons. A quarter inch layer of 325 mesh tabular alpha alumina powder is placed on the lower piston; while the mold is held with its axis in an upright position, the billet is placed on the powder and additional alumina is poured around it and over it to a depth of ¼ inch. The upper graphite piston is then inserted. The mold assembly is heated in a vacuum hot press without pressure from room temperature to 1000° C. in 20 minutes and then 4000 p.s.i. is applied and the temperature raised from 1000 to 1425° C. in eight minutes. A pressure of 4000 p.s.i. is maintained on the pistons to the alumina-encapsulating billet for a period of a total of 5 minutes while the temperature is maintained at 1400° C. Then the pressure is released and the mold removed from the furnace and cooled to 700° C. by radiation in 15 minutes.

After the alumina ceramic is broken away from the billet, it is tested as follows: the resulting body has a transverse rupture strength of 470,000 p.s.i.; a hardness of 90.5 Rockwell A; contains 11.7% cobalt and the cobalt binder phase contains 17% by weight of tungsten in solid solution. The acid resistance of the body is greater than 50 hours. The mean grain size of the tungsten carbide is 0.8 micron and 81% of the grains are smaller than one micron. The billet is shaped by electrodischarge machining into an extrusion die.

EXAMPLE 6

A scoring punch is made from a dense composition prepared as described in Example 1. The punch is used in a scoring operation on 302 stainless steel surgical blades and gives over 800,000 pieces per regrind compared with about 80,000 pieces for a conventional commercial carbide. Actual production rates are increased by a factor of two to three with the increased life of the scoring punch, because of decreased down time.

EXAMPLE 7

A binding head screw punch is made from a dense composition prepared as described in Example 1. The punch is used on a cold header machine to shape the heads on ¼ 20 x ⅞" 305 stainless steel screw blanks. Over 3,000,000 pieces are produced before a laminar type crack develops, causing a small piece to chip out of the face of the punch. The tool steel punches normally used average 200,000 pieces before failure. Commercial carbides are not dependable in this application, and failure frequently occurs after producing only a few hundred pieces.

EXAMPLE 8

An interdispersed powder of tungsten carbide and cobalt similar to that of Example 1, which has not been subjected to a reduction step, is loaded directly into a visible in cross-section, appearing as longitudinal areas predominantly aligned at right angles to the pressing direction. It will be noted that since in an array of platelets lying for the most part parallel to each other and at right angles to the plane of the cross-section, only a small portion of the platelets will by chance have been cut through the center to reveal the maximum platelet diameter or breadth. In most cases, less than the whole breadth of a platelet is revealed. Thus, judging by the cross-sections of the platelets, one can at least judge the maximum breadth, which in this case is about 5 microns. The thickness of different plates appears to be similar and about one micron. Electron micrographs show a mean grain size slightly less than one micron.

A glass cutting knife is made by cementing a triangular section of material "A," ¼ inch to a side and ⅛ inch in thickness in a suitable holder. The two corners of the triangular point are sharpened by diamond grinding, and prove to be very durable for scoring glass.

EXAMPLE 11

As an example of molding a large billet, the reduced powder of Example 1 is cold pressed to a billet 3 inches in diameter and 1 inch thick, by isostatic pressing in a rubber mold at 50,000 p.s.i. The billet is then heated very slowly in a vacuum furnace in an alumina crucible and degassed by heating over a period of eight hours at a uniform rate of temperature rise to 1000° C. The billet is then cooled to room temperature and hot pressed while embedded in alumina in a graphite cylindrical mold, 3 inches in inside diameter, fitted with graphite pistons. A quarter inch layer of 325 mesh tabular alpha alumina powder is placed on the lower piston; while the mold is held with its axis in an upright position, the billet is placed on the powder and additional alumina is poured around it and over it to a depth of ¼ inch. The upper graphite piston is then inserted. The mold assembly is heated in a vacuum hot press without pressure from room temperature to 1000° C. in 20 minutes and then 4000 p.s.i. is applied and the temperature raised from 1000 to 1425° C. in eight minutes. A pressure of 4000 p.s.i. is maintained on the pistons to the alumina-encapsulating billet for a period of a total of 5 minutes while the temperature is maintained at 1400° C. Then the pressure is released and the mold removed from the furnace and cooled to 700° C. by radiation in 15 minutes.

After the alumina ceramic is broken away from the billet, it is tested as follows: the resulting body has a transverse rupture strength of 470,000 p.s.i.; a hardness of 90.5 Rockwell A; contains 11.7% tungsten-cobalt alloy and the alloy binder phase contains 17% of tungsten carsolid solution. The mean grain size of the tungsten carbide is 0.8 micron and 81% of the grains are smaller than one micron.

The billet is shaped by electron discharge machining and used as an extrusion die for forming aluminum rod.

I claim:

1. A tool for shaping metal comprising a working surface consisting essentially of tungsten carbide bonded with from 1 to 30 percent by weight of a tungsten-cobalt alloy, the tungsten carbide mean grain size being less than 1 micron and at least 60% of the tungsten carbide grains being smaller than 1 micron, the tungsten-cobalt alloy consisting essentially of cobalt and from 8 to 33 percent by weight of tungsten, the density of the cutting edge being in excess of 98 percent of theoretical density and said edge having an ASTM porosity less than A-5.

2. A tool of claim 1 in which the cutting edge consists essentially of tungsten carbide bonded with from 3 to 15 percent by weight of tungsten-cobalt alloy.

3. A tool of claim 1 in which the cutting edge consists essentially of tungsten carbide bonded with from 8 to 15 percent by weight of tungsten-cobalt alloy.

4. A tool of claim 2 in which the tungsten-cobalt alloy consists essentially of cobalt and from 15 to 25 percent by weight of tungsten.

5. A tool of claim 3 in which the tungsten-cobalt alloy consists essentially of cobalt and from 15 to 25 percent by weight of tungsten.

6. A tool of claim 4 in which the tungsten carbide grains are anisodimensional, the ratio of longest dimension to shortest dimension being at least 3 to 1.

7. A tool of claim 5 in which the tungsten carbide grains are anisodimensional, the ratio of longest dimension to shortest dimension being at least 3 to 1.

8. A tool of claim 6 in which the largest face of the anisodimensional tungsten carbide grains is substantially oriented in parallel alignment to a reference line.

9. A tool of claim 7 in which the largest face of the anisodimensional tungsten carbide grains is substantially oriented in parallel alignment to a reference line.

10. A tool of claim 1 in which the cutting edge has an included angle of less than 30°.

References Cited

UNITED STATES PATENTS

| | | | |
|---|---|---|---|
| 873,745 | 12/1907 | Haynes | 75—171 |
| 1,057,423 | 4/1913 | Haynes | 75—171 |
| 1,338,132 | 4/1920 | Honda | 75—171 |
| 1,951,133 | 3/1934 | De Bats | 23—208 |
| 1,998,609 | 4/1935 | Comstock | 75—204 |
| 2,011,369 | 8/1935 | McKenna | 29—182.8 |
| 2,113,171 | 4/1938 | Cooper | 29—182.8 |
| 2,116,399 | 5/1938 | Marth | 75—204 |
| 2,122,403 | 7/1938 | Balke et al. | 29—182.7 |
| 2,731,711 | 1/1956 | Lucas | 29—182.8 |

FOREIGN PATENTS

| | | |
|---|---|---|
| 1,041,958 | 9/1966 | Great Britain. |

OTHER REFERENCES

Metals Handbook, 1948 edition, American Society for Metals, Novelty Park, Ohio, p. 63.

BENJAMIN R. PADGETT, Primary Examiner

A. J. STEINER, Assistant Examiner

U.S. Cl. X.R.

75—204